United States Patent
Matsuura et al.

(10) Patent No.: US 7,507,894 B2
(45) Date of Patent: Mar. 24, 2009

(54) SOUND DATA ENCODING APPARATUS AND SOUND DATA DECODING APPARATUS

(75) Inventors: Hiromitsu Matsuura, Tokyo (JP); Takehiro Tominaga, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 372 days.

(21) Appl. No.: 11/284,413

(22) Filed: Nov. 21, 2005

(65) Prior Publication Data

US 2006/0107820 A1    May 25, 2006

(30) Foreign Application Priority Data

Nov. 25, 2004   (JP)   .............................. 2004-339954

(51) Int. Cl.
*G10H 1/00*    (2006.01)

(52) U.S. Cl. .............................. 84/600; 84/601; 84/603; 700/94; 704/253; 704/258

(58) Field of Classification Search ........... 84/600–603; 704/253, 258; 700/94
See application file for complete search history.

(56) References Cited

U.S. PATENT DOCUMENTS

| | | | | |
|---|---|---|---|---|
| 5,298,671 | A | * | 3/1994 | Bliss .......................... 84/603 |
| 5,519,166 | A | * | 5/1996 | Furuhashi et al. ............. 84/603 |
| 5,886,277 | A | * | 3/1999 | Takauji ........................ 84/604 |
| 6,138,207 | A | * | 10/2000 | Rossum ...................... 711/118 |
| 6,242,681 | B1 | * | 6/2001 | Daishoji ...................... 84/604 |
| 6,441,290 | B2 | * | 8/2002 | Fujita et al. .................. 84/603 |
| 6,486,389 | B1 | * | 11/2002 | Suzuki et al. ................. 84/603 |
| 6,584,273 | B1 | | 6/2003 | Ashley et al. |
| 2005/0114136 | A1 | * | 5/2005 | Hamalainen et al. ........ 704/258 |
| 2006/0107820 | A1 | * | 5/2006 | Matsuura et al. .............. 84/603 |
| 2006/0107821 | A1 | * | 5/2006 | Matsuura et al. .............. 84/603 |

FOREIGN PATENT DOCUMENTS

| | | |
|---|---|---|
| JP | 8-287612 | 11/1996 |
| JP | 11282465 | 10/1999 |
| JP | 2001109498 | 4/2001 |
| JP | 2002519917 | 7/2002 |

OTHER PUBLICATIONS

Notification of Reason(s) for Refusal dated Nov. 11, 2008, for the corresponding Japanese Patent Application JP 2004-339954.

* cited by examiner

*Primary Examiner*—David S. Warren
(74) *Attorney, Agent, or Firm*—Katten Muchin Rosenman LLP

(57) ABSTRACT

A processing load at the time of playing back sound data having a loop part is reduced.

A sound data encoding apparatus comprises a block dividing means that divides the sound data into blocks according to predetermined rules, and an encoding means that encodes the blocks in groups of a plurality of consecutive blocks. The block dividing means divides the sound data such that, when encoded blocks encoded by the encoding means are decoded to output decoded blocks, then the loop end position in a block that includes the loop end position in the decoded blocks is nearer to an end of the block than a predetermined position. In detail, input delay dummy data are added ahead of the sound data before dividing the sound data. At the time of outputting the encoded data, loop information is outputted also. The loop information includes the number of samples of the added input delay dummy data, the number of samples corresponding to the encoding delay, the number of samples corresponding to the decoding delay, the start and end positions of the sound data, and the loop start and end positions.

29 Claims, 12 Drawing Sheets

SOUND DATA ENCODING APPARATUS AND SOUND DATA DECODING APPARATUS

BACKGROUND OF THE INVENTION

The present invention relates to recording and playing of sound data, and particularly to a recording and playing technique that reduces a processing load at the time of playing back sound data having a loop part.

In an information processing apparatus having a digital sound data playing function, such as a personal computer, a game machine, a music playing apparatus or the like, coded sound data are converted into analog sound data before sound output at the time of playing.

Some coded sound data, such as data of a music CD, are non-compressed. However, in many cases, sound data are read in a compressed state, and at the time of playing, expanded and outputted as sound.

Various sound compression methods have been proposed and practically used. Widely known is a method in which time series sample data are divided into a plurality of blocks, and an orthogonal transform such as DCT (Discrete Cosine Transform) or MDCT (Modified Discrete Cosine Transform) is applied to those blocks to obtain compressed data. In that case, to increase continuity of sound waveforms, compression is sequentially performed in groups of adjacent blocks, while making each group overlap with the next one in a block. As a representative of such compression methods, may be mentioned ATRAC (Adaptive TRans form Acoustic Coding) employed by a so-called mini disc (MD) and the like (See Patent Document 1).

FIG. 3 is a diagram showing compression of sound data in blocks. In the figure, time series sample data are divided into blocks (original blocks) A, B, C, D, E, . . . , each consisting of predetermined pieces of data.

Then, compression is performed in groups of two consecutive blocks, with each group overlapping the next group in one block, to generate encoded blocks. Here, no sound data exists before the start position (DS) of the sound data, and accordingly, there is no block to be paired with the block A. Thus, a block A0 consisting of dummy data such as silence data is added to be paired with the block A.

Then, in this example, encoded data X1 are generated from the original blocks A0 and A, and encoded data X2 from the original blocks A and B.

At the time of playing the sound data, a decoded block a is generated from the encoded blocks X1 and X2. Then, the samples of the decoded block a are subjected to D/A conversion to reproduce the sound. In the same way, decoded blocks b, c, . . . can be obtained, and thus, the sound is reproduced continuously. Here, FIG. 3(d) shows the decoded blocks in the case where audio codec delay occurs at the time of encoding and decoding. As shown in the figure, output positions of the decoded data are shifted by the size of the audio codec delay.

Patent Document 1: Japanese Non-examined Patent Laid-Open No. 8-287612

Sometimes, sound data include a loop part (a repeat part). For example, as shown in FIG. 3(a), there is a case where sound ranging from a prescribed position (LS) to another prescribed position (LE) of sample data is repeated until a certain condition is satisfied. Here, it is assumed that the start position LS of the loop is included in the original block A and the end position LE of the loop is included in the original block D.

At the time of playing in that case, as shown in FIG. 4, when playing is performed down to the position corresponding to LE in the decoded block d, then, playing is performed from the position corresponding to LS in the decoded block a.

Here, FIG. 4 shows the decoded blocks in the case where audio codec delay occurs at the time of encoding and decoding. As shown in the figure, output positions are shifted backward by the size of the audio codec delay. Namely, the loop start position and the loop end position are shifted backward by the size of the audio codec delay in comparison with the case where the audio codec delay does not exist.

The decoded block d is generated from the encoded blocks X4 and X5. Since the encoded block X4 has been already read for generating the decoded block c, it is sufficient to read X5 only. On the other hand, the decoded block a is generated from the encoded blocks X1 and X2. At the time of returning from the loop end, both the blocks X1 and X2 are read and processed.

At the time of looping, the decoded block a, which is played back immediately after the decoded block d, should have been generated until the playing of the decoded block d is ended. However, the whole of the decoded block d is not played back, but the decoded block d is played back only up to the position of LE. Thus, the decoded block a should be generated in a short time, and the processing load becomes large temporally.

This increase of the processing load at looping is a big problem for a sound data playing apparatus, such as a portable game machine, a portable music player, or the like, for which portability is important even if its processing speed is restricted.

An object of the present invention is to reduce a processing load at the time of playing back sound data including a loop part.

SUMMARY OF THE INVENTION

To solve the above problem, a first mode of the present invention provides a sound data encoding apparatus for encoding sound data having a loop part whose loop start position and loop end position are designated, wherein: the sound data encoding apparatus comprises: a block dividing means that divides the sound data into blocks; and an encoding means that encodes the blocks in groups of a plurality of consecutive blocks; and said block dividing means divides said sound data to have the loop end position included in a block of a decoded block which is outputted when the sound data is divided into said blocks according to predetermined rules and thereafter encoded by the encoding means followed by decoding by a decoding apparatus, to be nearer to an end of the block than a predetermined position.

Further, a second mode of the present invention provides a sound data encoding apparatus for encoding sound data having a loop part whose loop start position and loop end position are designated, comprising: a block dividing means that divides the sound data into blocks; and an encoding means that encodes the blocks in groups of a plurality of consecutive blocks; wherein: said block dividing means divides said sound data to have the loop end position included in a block of a decoded block which is outputted when the sound data is divided into said blocks according to predetermined rules and thereafter encoded by the encoding means followed by decoding by a decoding apparatus, to be in last position of the block.

Further, a third mode of the present invention provides a sound data encoding apparatus for encoding sound data having a loop part whose loop start position and loop end position are designated, comprising: a storing means that stores a loop end sample condition number; a block dividing means that divides the sound data into blocks; and an encoding means that encodes the blocks in groups of a plurality of consecutive blocks; wherein: said block dividing means divides said sound data to have the sound data to be played at a time of the loop to include at least the loop end sample condition number, in a block of a decoded block which is outputted when the sound data is divided into said blocks according to predetermined rules and thereafter encoded by the encoding means followed by decoding by a decoding apparatus.

Further, a fourth mode of the present invention provides a sound data encoding apparatus for encoding sound data having a loop part whose loop start position and loop end position are designated, comprising: a block dividing means that divides the sound data into blocks; and an encoding means that encodes the blocks in groups of a plurality of consecutive blocks; wherein: said block dividing means divides said sound data to have the sound data added ahead thereof with dummy data whose number of samples is less than or equal to obtained number of samples ranging from the loop end position to an end of a block that includes said loop end position, in the block of a decoded block which is outputted when the sound data is divided into said blocks according to predetermined rules and thereafter encoded by the encoding means followed by decoding by a decoding apparatus.

The above-described sound data encoding apparatus may further comprise a loop information output means that outputs loop information used for specifying a sound data start position, a sound data end position, the loop start position and the loop end position in the decoded data outputted by decoding the encoded data encoded by the encoding means.

Further, the loop information may include information of the number of samples of dummy data added ahead of the sound data.

Further, a fifth mode of the present invention provides a sound data playing apparatus that sequentially reads encoded data encoded by the above-described sound data encoding apparatus and decodes the encoded data in groups of a plurality of consecutive blocks.

Further, the above-described sound data playing apparatus may further comprises a play means that uses the loop information to specify the sound data start position, the sound data end position, the loop start position and the loop end position in the decoded data. At the time of playing back a decoded block that includes the sound data start position, the play means cuts samples before the sound data start position and plays back samples on and after the sound data start position. At the time of playing back a decoded block that includes the sound data end position, the play means cuts samples after the sound data end position and plays back samples up to the sound data end position. At the time of playing back a decoded block that includes the loop start position, the play means cuts samples before the loop start position and plays back samples on and after the loop start position. And, at a time of playing back a decoded block that includes the loop end position, the play means cuts samples after the loop end position and plays back samples up to the loop end position.

DETAILED DESCRIPTION

Figure 1:
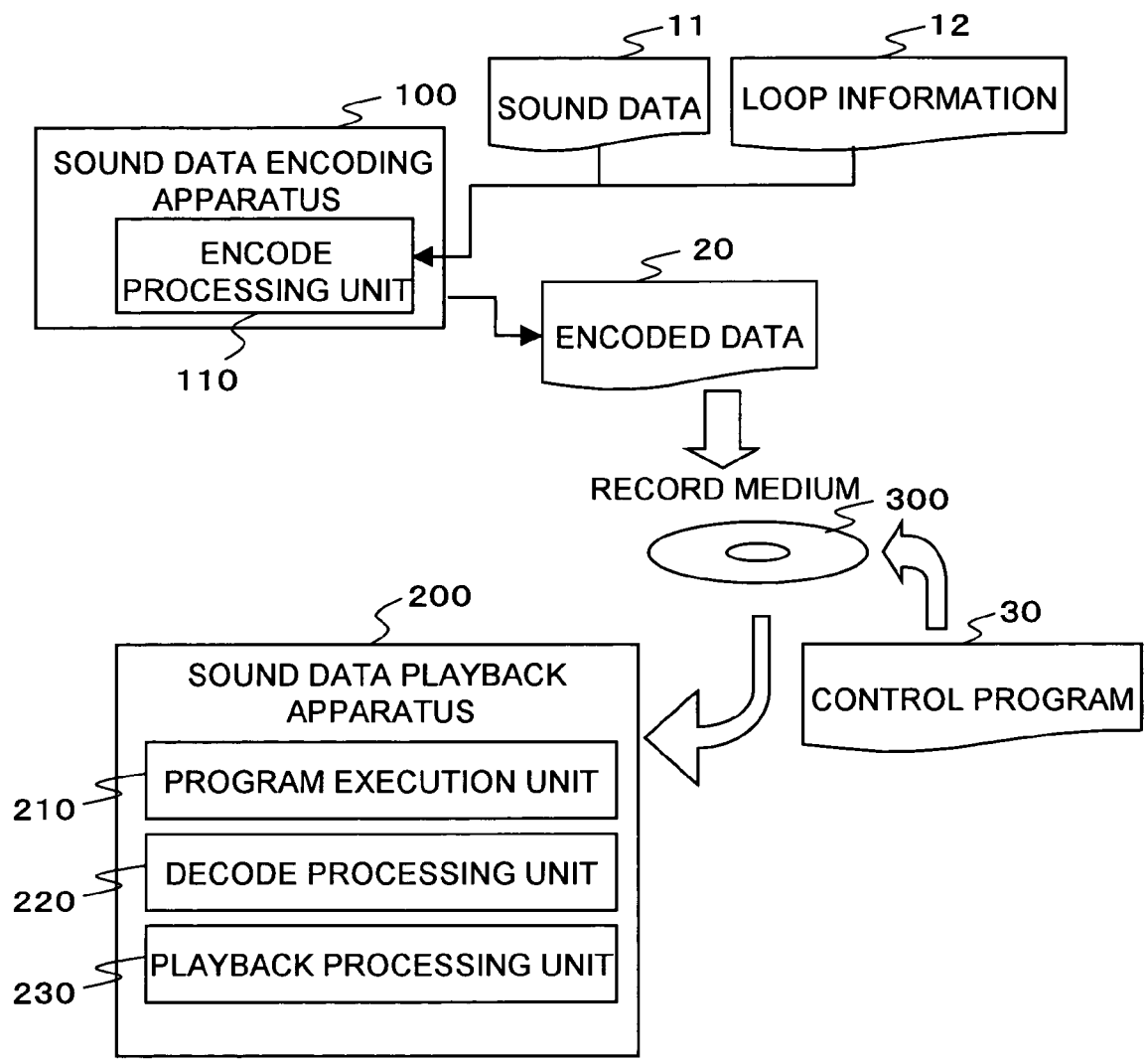
FIG. 1 is a diagram showing an outlined configuration of an embodiment of the present invention.

Embodiments of the present invention will be described referring to the drawings. FIG. 1 is a diagram showing an outlined configuration of an embodiment of the present invention. As shown in the figure, in the present embodiment, sound data encoded by a sound data encoding apparatus 100 are decoded and played back by a sound data playback apparatus 200.

In detail, the sound data encoding apparatus 200 reads sound data 11 as a recorded object, performs processing such as compression using an encode processing unit 110 to convert the sound data 11 into encoded data 20. Here, it is assumed that the sound data 11 are data sampled previously at a predetermined rate. Of course, it is possible that analog sound data are inputted into the sound data encoding apparatus 100 and the sound data encoding apparatus 100 performs A/D conversion on the inputted analog sound data.

In the present embodiment, the sound data 11 includes a loop part, and the loop start position and the loop end position are designated in advance. The loop start position and loop end position are designated by addresses, sample numbers or the like in the sound data 11, and such addresses or the like are read as loop information 12 together with the sound data 11. The loop information 12 may be added to a header part of the sound data 11 or may exist separately from the sound data 11.

As for the loop part, at the time of playing of the sound data 11 in the sound data playback apparatus 200, existence or nonexistence of a loop is judged according to a certain condition.

When it is judged that looping should be executed as a result of the judgment on the existence or nonexistence of a loop, then looping is executed according to the loop information 12. Namely, playing is performed down to the loop end position, and then playing is continued by returning to the loop start position. On the other hand, when it is judged that looping should not be executed, then looping is not executed irrespective of the loop information 12. Namely, playing is performed down to the loop end position, and then playing of the sound data 11 following the loop end position is continued.

The developer can freely determine which part of the sound data 11 should be a loop part, based on the content of the sound data 11.

The encode processing unit 110 of the sound data encoding apparatus 100 divides the sound data 11 into a plurality of blocks. Then, taking a predetermined number of consecutive blocks as one unit, encoding is performed according to MDCT (Modified Discrete Cosine Transform) on each unit, which overlaps the next unit in a block, to generate encoded data successively. Details of the processing in the encode processing unit 110 will be described later.

The encoded data 20 are recorded together with a control program 30, which controls loop processing of the sound data 11, into a record medium 300 such as a CD-ROM. Record processing into a record medium 300 may be performed by the sound data encoding apparatus 100. Or another apparatus may perform the record processing.

Or, the encoded data 20 and the control program 30 may be recorded respectively into separate record media 300. Further, the record medium 300 is not limited to a CD-ROM, and may be used an optical disk such as a DVD-ROM, a magnetic disk, a semiconductor storage device, or the like. Or, it is possible that the sound data encoding apparatus 100 outputs the encoded data 20 to the sound data playback apparatus 200 through a communication line such as the Internet.

The control program 30 is a program executed in the sound data playback apparatus 200. According to the control program 30, the sound data playback apparatus 200 determines a method of playing back the encoded data 20, for example, in response to operation by a user. For example, a loop part is played back repeatedly until a certain operation such as a key input is received from a user. And, when the certain operation is received, the playing of the loop part is ended and data following the loop part are played back.

The sound data playback apparatus 200 comprises: a program execution unit 210 for executing the control program 30 and the like; a decode processing unit 220 for decoding the encoded data 20; and a playback processing unit 230 for sound-outputting the decoded sound data through a speaker. By this arrangement, the sound data playback apparatus 200 can decode and play the encoded data 20 almost in real time. Detailed processing in the decode processing unit 220 will be described later.

Here, the sound data encoding apparatus 100 can be implemented by a personal computer, a workstation, or another general information processing apparatus, as far as it has a sound processing function. Of course, a dedicated system specialized in sound data recording may be used as the sound data encoding apparatus 100.

Also, the sound data playback apparatus 200 can be implemented by a personal computer, a workstation, or another general information processing apparatus, as far as it has a sound processing function. Of course, a dedicated system specialized in sound data playing may be used as the sound data playback apparatus 200.

The present invention can be applied more effectively to the case where, as the sound data playback apparatus 200, is used an information processing apparatus, such as a PDA (Personal Digital Assistant), a portable game machine, or a portable music player, whose processing speed is restricted due to its emphasis on portability.

An information processing apparatus can function as the sound data encoding apparatus 100 or the sound data playback apparatus 200 when an application program developed for sound data recording or sound data playing is executed by its central processing unit (CPU). These application programs may be circulated in the market, being recorded on a record medium such as a CD-ROM or the like. Or, these programs may be circulated through a computer network such as the Internet.

Figure 2:
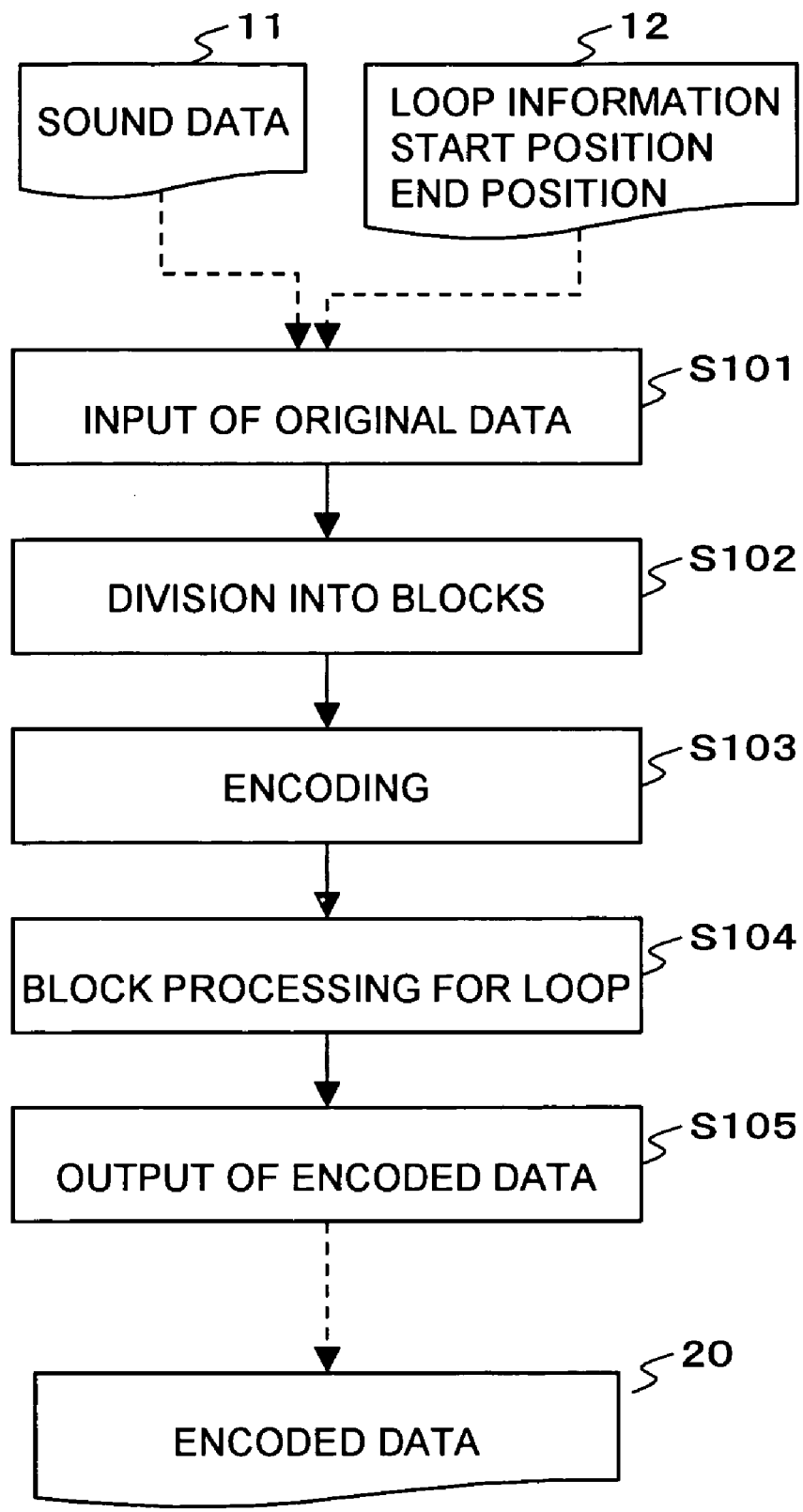
FIG. 2 is a flowchart for explaining encode processing in a sound data encoding apparatus 100.

Next, referring to a flowchart of FIG. 2, will be described the processing of encoding sound data in the sound data encoding apparatus 100.

First, the sound data encoding apparatus 100 reads sound data 11 and loop information 12 as original data (S101). Here, the sound data 11 are time series sample data as shown in FIG. 3(a), and the loop information 12 designates a loop start (LS) position and a loop end (LE) position in the sound data 11.

Next, the encode processing unit 110 divides the sound data 11 into blocks (S102).

Figure 3:
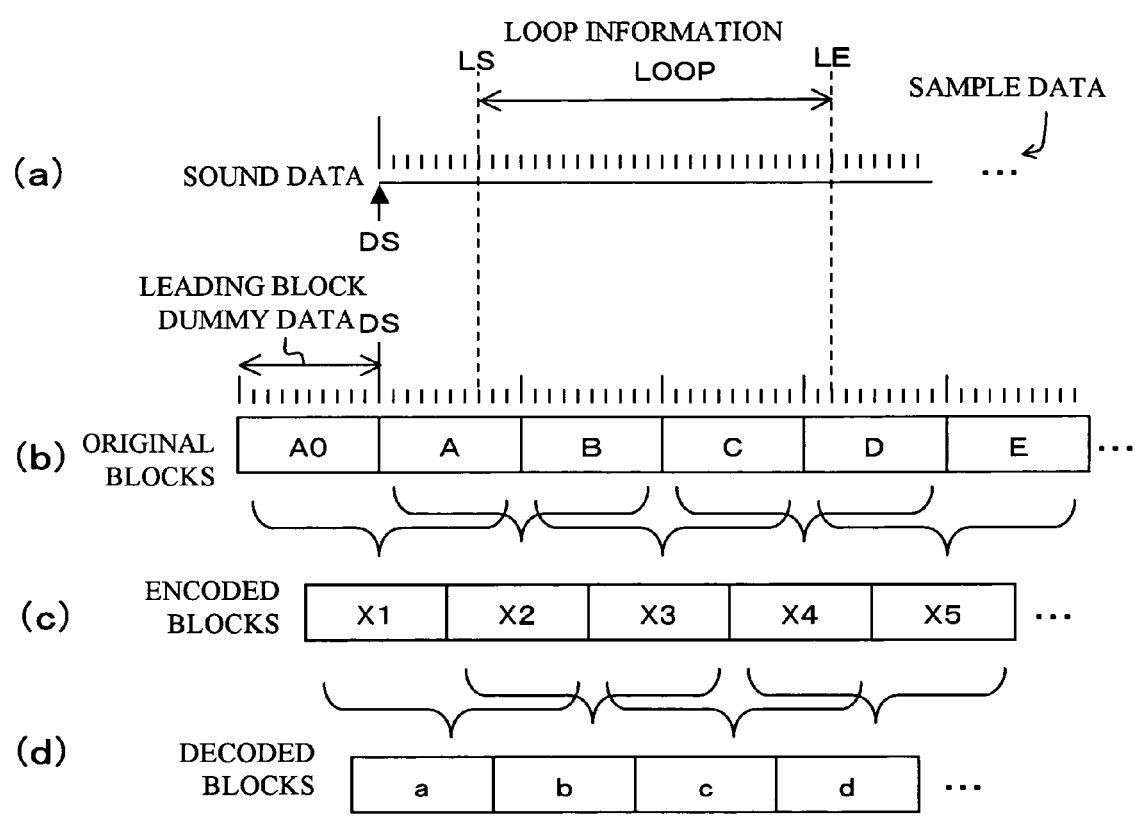
FIG. 3 is a diagram for explaining a method of dividing blocks of sound data 11.
Figure 4:
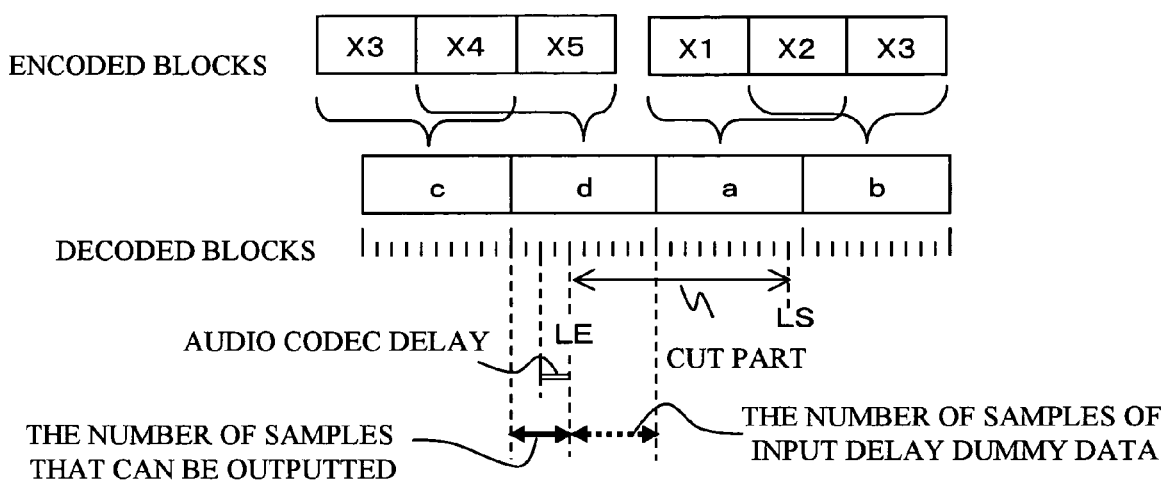
FIG. 4 is a diagram for explaining processing in blocks at the time of looping.

Conventionally, as shown in FIG. 3(b), the sound data 11 are divided sequentially, beginning at the sound data start position (DS). As a result, as shown in FIG. 4, in the block d that includes the loop end position of the decoded data, the loop end position does not necessarily come in the last part (for example, the end) of the block.

Figure 7:
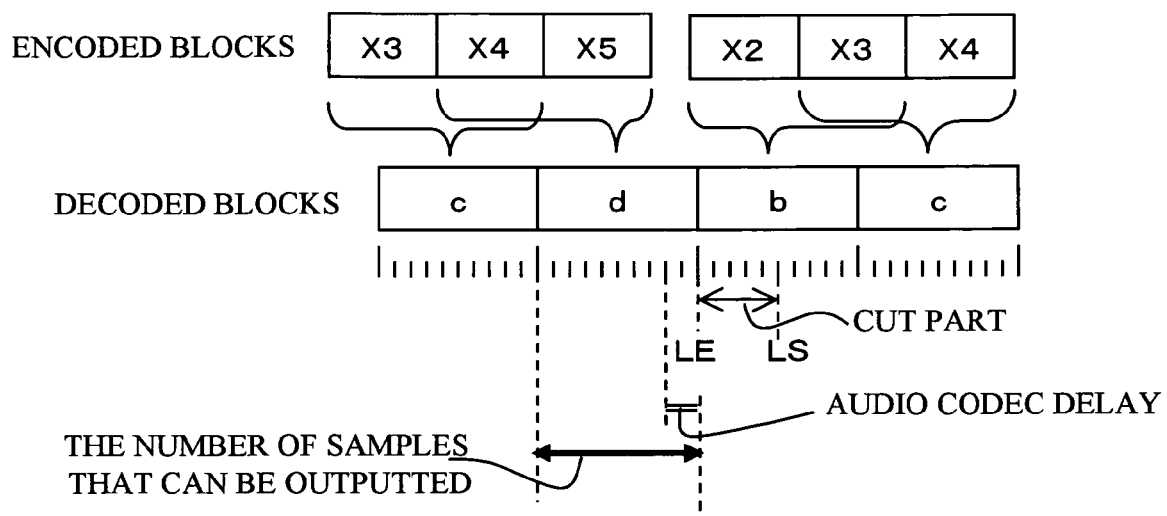
FIG. 7 is a diagram for explaining processing in blocks at the time of looping.

On the other hand, in the present embodiment, as shown in FIG. 5(b), input delay dummy data are added ahead of the sound data, before dividing the sound data. As a result, as shown in FIG. 7, in the block d that includes the loop end position of the decoded data, the loop end position is made to come in the last part (for example, the end) of the block.

In detail, the encode processing unit 110 tentatively divides the sound data 11 into groups of a predetermined number of samples from the top as in the conventional case as shown in FIG. 3(b). When the thus-divided sound data 11 are encoded and further decoded, blocks of decoded data are obtained as shown in FIG. 4. Here, with respect to the block d that includes the loop end position, the encode processing unit 110 obtains the number of samples after the loop end position up to the end of the block. The obtained number of samples becomes the number of samples of the input delay dummy data.

Next, as shown in FIG. 5(b), dummy data (for example, silence data), whose number equals the obtained input delay dummy data sample number, are added ahead of the sound data 11.

Here, will be described the case where the number of samples of one block is L. It is assumed that, when the original sound data are divided starting from the top, the loop end position becomes the X-th sample (1<=X<=L) in the block including the loop end position. In that case, to make the loop end position become the L-th sample (the end of the block) in the block in question of the decoded data, the number of samples of the input delay dummy data to be added is L−X.

However, in the case where audio codec delay occurs, then assuming that the number of samples corresponding to encoding delay is ED and the number of samples corresponding to decoding delay is DD, the number of samples of the input delay dummy data to be added is L−1−(X−1+ED+DD) % L (where % means residue arithmetic).

Here, the number of samples of the audio codec delay (ED and DD) is stored in advance in a storage unit of the sound data encoding apparatus 100.

Next, the encode processing unit 110 adds a block A0 ahead of the sound data 11, to pair with the block A at the time of encoding. The block A0 is a block of dummy data (hereinafter, referred to as leading block dummy data). The leading block dummy data are silence data, for example.

FIG. 5(b) shows that the sound data 11 are added with the input delay dummy data and the leading block dummy data, and thereafter, divided into blocks (original blocks). In the shown example, the start position (DS) of the sound data 11 is included in the original block A. The loop start position is included in the original block B. And, the loop end position is included in the original block D.

Although it is assumed here that the number of samples of each block is constant, that number may vary according to given rules.

Next, the encode processing unit 110 performs sound compression (encoding) in units of consecutive original blocks (S103). Here, regardless of existence or nonexistence of the loop information, encode processing is performed for each of the original blocks arranged in time series.

In this example, in the encode processing, two consecutive original blocks generate one encoded block. Each pair of consecutive blocks overlaps with the next pair in one block, and thus each original block is used twice for generating an encoded block and then for generating the next encoded block.

Namely, as shown in FIG. 5(c), the consecutive original blocks A0 and A generate an encoded block X1, and the original blocks A and B generate an encoded block X2. Then, in the same way, encoded blocks X3, X4, X5, . . . are generated.

As such a compression method, a representative one is ATRAC (Adaptive Trans form Acoustic Coding). However, the present invention is not limited to this. Further, it may be arranged that three consecutive original blocks generate one encoded block.

Next, the sound data encoding apparatus 100 outputs the time series encoded blocks as encoded data 20 (S105). At that time, loop information is generated as additional information to the encoded data 20, and outputted together with the encoded data 20.

The loop information includes information that can specify the sound data start position, the sound data end position, the loop start position and the loop end position in decoded data outputted by decoding the encoded data.

Or, for example, the loop information may include information of these positions themselves, i.e., the sound data start position, the sound data end position, the loop start position and the loop end position in the decoded data outputted by decoding the encoded data.

Or, the loop information may include the sound data start position, the sound data end position, the loop start position and the loop end position in the original sound data. In that case, to be able to specify these positions in the decoded data, the loop information further includes the number of samples of the input delay dummy data, the number of samples corresponding to the encoding delay and the number of samples corresponding to the decoding delay. Here, the number of samples of the input delay dummy data, the number of samples corresponding to the encoding delay and the number of samples corresponding to the decoding delay may be included separately, or the total number of samples obtained by adding up these numbers of samples may be included. In the case where the sound data playback apparatus 200 stores the number of samples corresponding to the encoding delay, it is not necessary that the loop information includes that number. Further, in the case where the sound data playback apparatus 200 stores the number of samples corresponding to the decoding delay, it is not necessary that the loop information includes that number.

As described above, the encoded data outputted by the sound data encoding apparatus 100 are recorded together with the control program 30 into a record medium 300 and circulated in the market.

Figure 6:
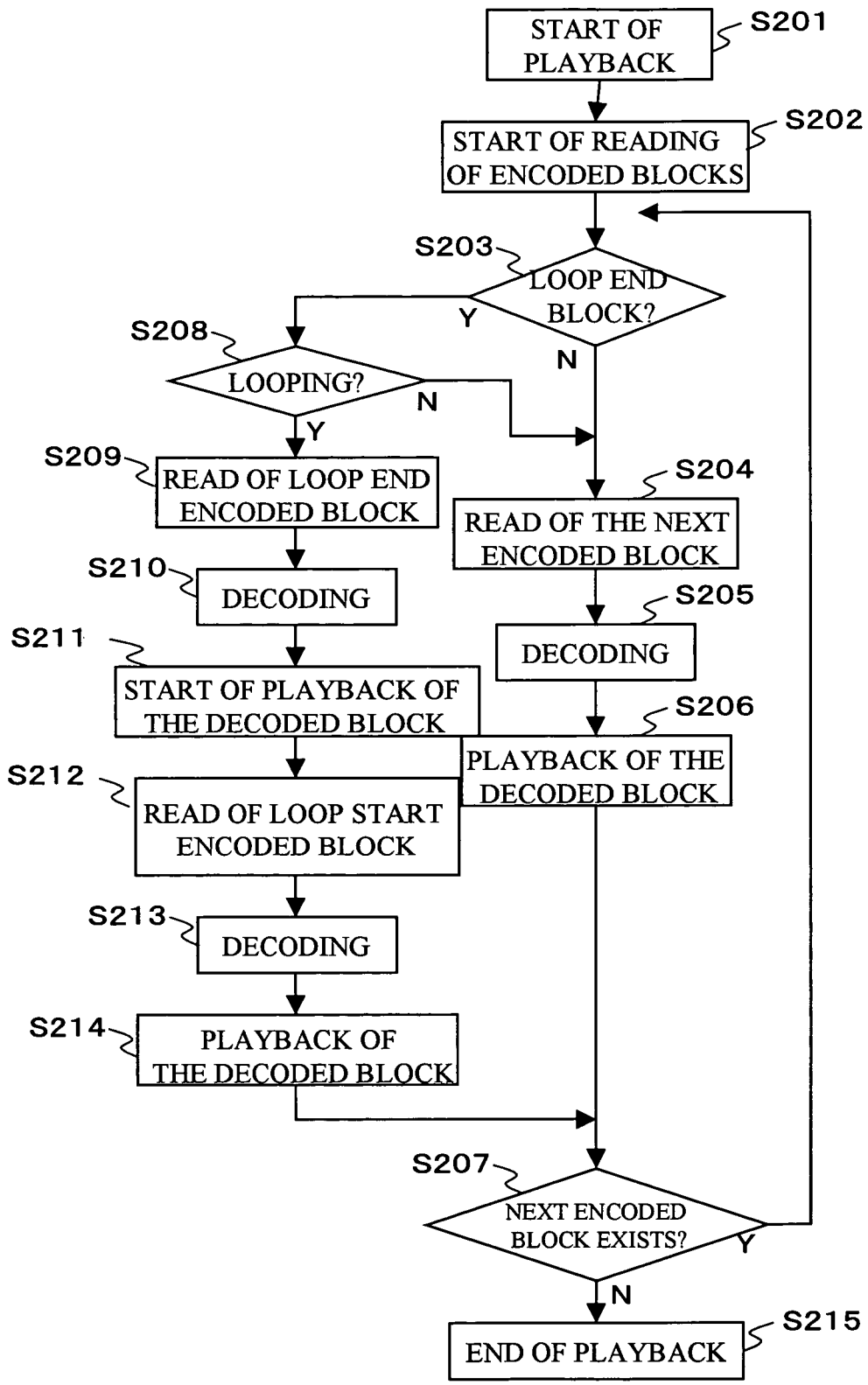
FIG. 6 is a flowchart for explaining play processing in a sound data playback apparatus 200.

Next, referring to a flowchart of FIG. 6, will be described play processing in the sound data playback apparatus 200.

Based on the loop information, the sound data playback apparatus 200 identifies the sound data start position, the sound data end position, the loop start position and the loop end position in the decoded data. A method of identifying these positions is as follows.

For example, in the case where the loop information includes the information of those positions themselves, i.e., the sound data start position, the sound data end position, the loop start position and the loop end position in the decoded data, it is possible to identify those positions from the information.

Further, in the case where the loop information includes the information of the sound data start position, the sound data end position, the loop start position and the loop end position in the original sound data, then the loop information further includes the number of samples of the input delay dummy data, the number of samples corresponding to the encoding delay and the number of samples corresponding to the decoding delay. Or, the sound data playback apparatus 200 may store the number of samples corresponding to the encoding delay and/or the number of samples corresponding to the decoding delay. In these cases, it is possible to identify that the sound data start position, the sound data end position, the loop start position and the loop end position in the decoded data lie backward by the sum total of the number of samples of the input delay dummy data, the number of samples corresponding to the encoding delay and the number of samples corresponding to the decoding delay in comparison with the respective positions in the original sound data.

Now, will be described the flowchart of FIG. 6. This flow is started when a request for playing of the sound data recorded in a record medium is received as a result of user's operation or the like (S201).

First, the decode processing unit 220 reads the encoded block at the top of the encoded data 20 and the loop information (S202).

First, will be described playing in the case where the loop is not executed. Here, the case where the loop is not executed means the case where a block as an object of playing (a block after decoding; a decoded block) does not include the loop end position (S203: N), or the case where the block in question includes the loop end position (S203: Y) and yet the loop should not be executed (S208: N). Whether the loop is executed or not is judged by the program execution unit 210 according to the control program. Further, whether the decoded block includes the loop end position or not can be judged from the number of already-played-back blocks, the number of samples included in each block and the loop information.

In the case where the loop is not executed, the decode processing unit 220 reads the next encoded block as conventionally (S204), and performs decoding using the consecutive encoded blocks to generate a decoded block (S205).

Namely, as shown in FIG. 5(d), the encoded blocks X1 and X2 generate the decoded block a, and the encoded blocks X2 and X3 generate the decoded block b, and so on. The decoded blocks a, b, . . . are sound data corresponding to the original blocks A, B . . . . However, in the case where audio codec delay occurs, it causes a shift by the number of samples corresponding to the audio codec delay.

The playback processing unit 230 plays back the sound data by sequentially performing D/A conversion of the decoded blocks, to output sound (S206). At the time of generating and playing back the decoded block that includes the sound data start position, the playback processing unit 230 cuts the input delay dummy data and the sample part corresponding to the audio codec delay, which are added ahead of the sound data 11, and plays the decoded block from the sound data start position. Further, at the time of playing back the decoded block that includes the sound data end position, the playback processing unit 230 plays back the decoded block up to the sample at the end position, and cuts the samples after the end position not to play those samples. The above-described processing is continued until the encoded blocks end (S207, S215).

Next, will be described playing in the case where the loop is executed. Here, the case where the loop is executed means the case where a decoded block as an object of playing includes the loop end position (S203: Y) and the loop should be executed (S208: Y).

In that case, the decode processing unit 220 reads the next encoded block. Referring to FIG. 7, will be described this case. Here, when an object of playing is the decoded block d, the repeat occurs. Since the encoded block X4 has been already read for processing the decoded block c, the encoded block X5 is read at this point (S209).

Then, the decode processing unit 220 generates the decoded block d from the blocs X4 and X5 (S210). And, the playback processing unit 230 starts playing of the decoded block d (S211).

Here, the playback processing unit 230 plays back the block d up to the sample at the loop end position, and cuts the samples after the loop end position not to play those samples. In the example shown in FIG. 7, the loop end position is at the end of the block d, and thus, the playback processing unit 230 plays back all the samples included in the block d.

After the generation of the decoded block d, the decode processing unit 220 immediately reads the encoded blocks X2 and X3 for obtaining the decoded block b that includes the loop start position (S212). Then, the decode processing unit 220 generates the decoded block b from the blocks X2 and X3 (S213). In FIG. 4, the block a includes the loop start position. However, in FIG. 5, the input delay dummy data are added to the sound data at the time of encoding, and thus, the block b includes the loop start position.

The playback processing unit 230 plays back the decoded block b. However, in the decoded block b, data to be played back are sample data located after the loop start position. Accordingly, the playback processing unit 230 cuts the samples located before the loop start position, and plays back the sample data from the loop start position (S214). Here, as described above, the playback processing unit 230 judges the loop start position referring to the loop information.

Hereinabove, one embodiment of the present invention has been described. According to the above embodiment, in the blocks of the decoded data, the loop end position is located at the end of a block. Accordingly, the block at the loop end position includes sufficient data to be played back (samples that can be outputted as sound). In other words, even in the case where the loop should be played back, the sound data playback apparatus 200 can have a sufficient time for generating the decoded data at the loop start position. And, the processing load at the time of looping is reduced.

Figure 5:
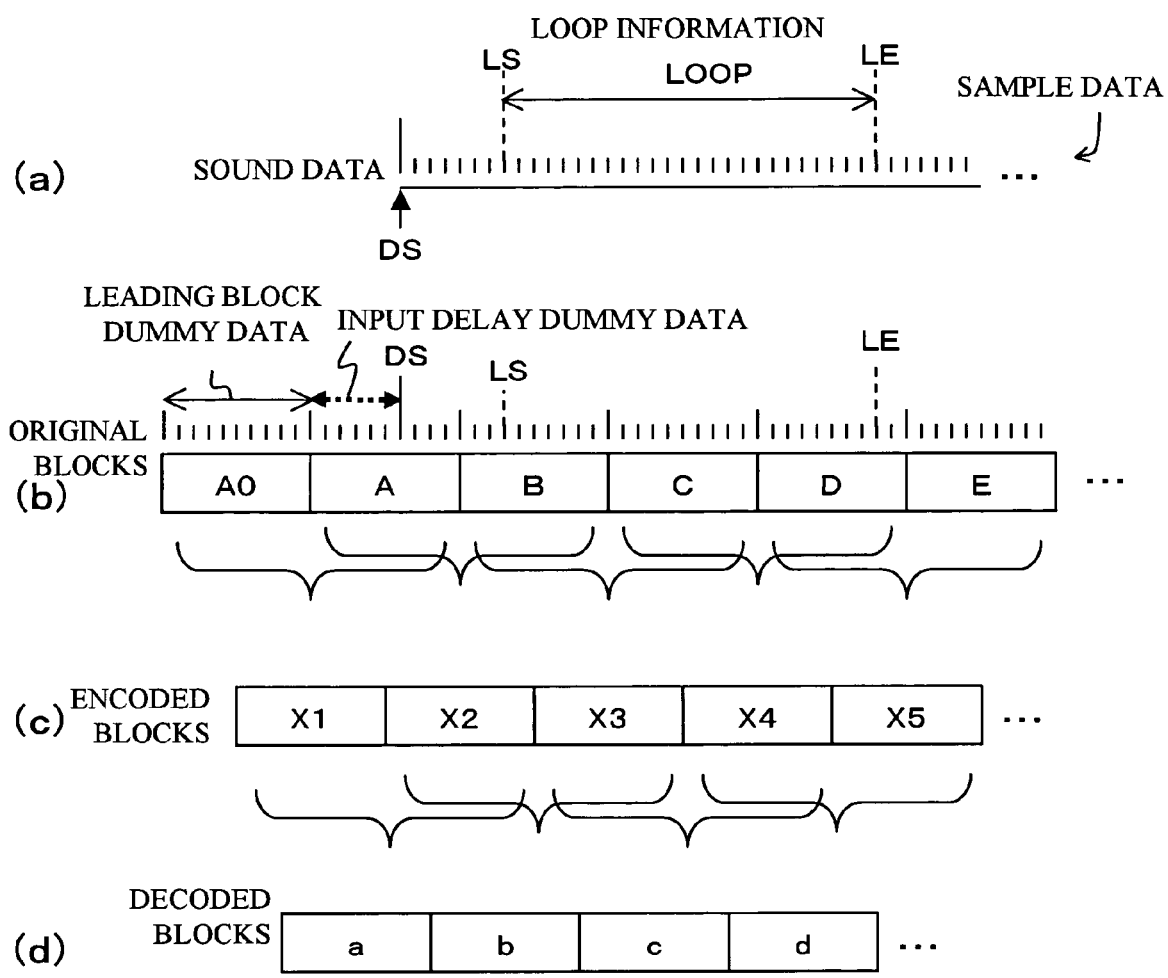
FIG. 5 is a diagram for explaining a method of dividing blocks of the sound data 11.

Further, according to the above embodiment, sometimes blocks relating to looping become smaller in number, and the processing load is reduced. For example, when the sound data are divided as shown in FIG. 3(*b*), then the decoded blocks relating to the loop part are four blocks, a, b, c and d as shown in FIG. 3(*d*). To obtain these decoded blocks, it is necessary to process five encoded blocks X1, X2, X3, X4 and X5. On the other hand, in the above embodiment, the input delay dummy data are added to the sound data before dividing the sound data as shown in FIG. 5(*b*). As a result, as shown in FIG. 5(*d*), the decoded blocks relating to the loop part becomes three blocks, b, c and d. To obtain these blocks, it is sufficient to process four encoded blocks X2, X3, X4 and X5.

The above embodiment can be modified variously.

For example, in the above embodiment, sound data are divided into blocks such that the loop end position is located at the end of a block. However, a method of dividing sound data is not limited to this. It is not necessary that the loop end position is located at the end of a block. It is sufficient that, as a result of division, the loop end position is located at least in the latter part of a block of the decoded data. Namely, it is sufficient that, when the sound data playback apparatus 200 processes the loop, a sufficient time can be ensured for decoding the block at the loop start position. In other words, it is sufficient that the block including the loop end position has sufficient data to be played back (i.e., samples that can be outputted as sound). In the block at the loop end position, the number of samples to be played back at the time of looping (loop end sample condition number) can be selected depending on the performance of the sound data playback apparatus 200.

The sound data encoding apparatus 100 stores in advance the loop end sample condition number in its storage unit, considering the performance of the sound data playback apparatus 200.

In detail, as shown in FIG. 3(*b*), the encode processing unit 110 tentatively divides the sound data 11 into blocks of a given number of samples, beginning at the top of the sound data 11.

Figure 8:
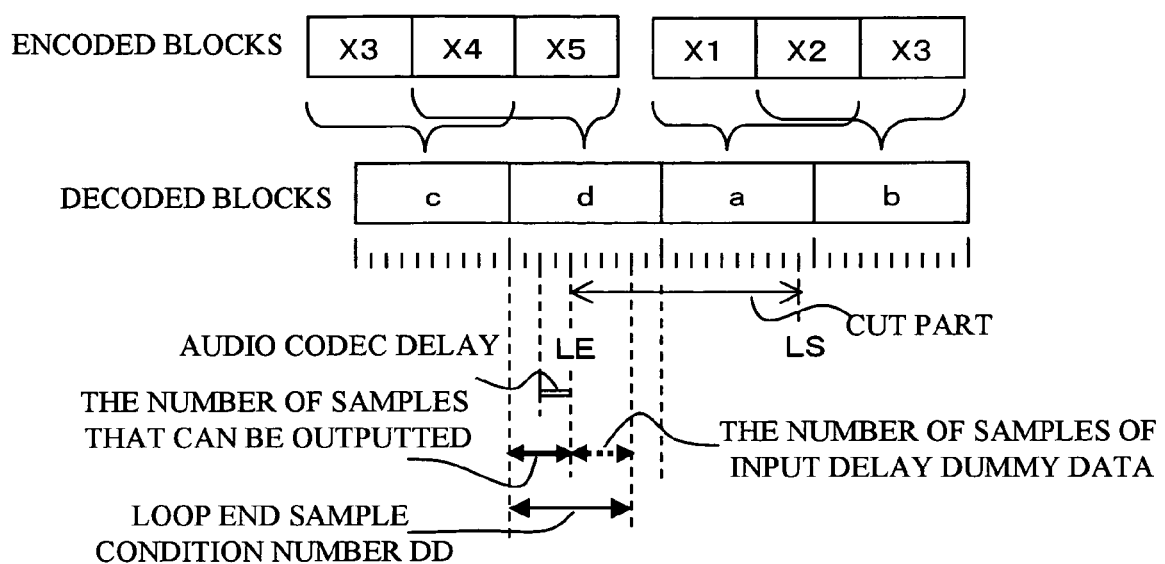
FIG. 8 is a diagram for explaining obtention of the number of samples of input delay dummy data in a variational example.

Thus-divided sound data 11 are encoded and then decoded to obtain blocks of the decoded data as shown in FIG. 8. Then, the encode processing unit 110 judges whether the number of samples up to the loop end position (the number of samples that can be outputted as sound) in the block including the loop end position is larger than or equal to the loop end sample condition number. In the case where the number of samples that can be outputted is larger than or equal to the loop end sample condition number, the sound data 11 are divided and encoded without adding the input delay dummy data.

On the other hand, in the case where the number of samples up to the loop end position (the number of samples that can be outputted as sound) is less than the loop end sample condition number, a difference between the loop end sample condition number and the number of samples that can be outputted as sound is obtained. The obtained difference is set as the number of samples of the input delay dummy data.

Figure 9:
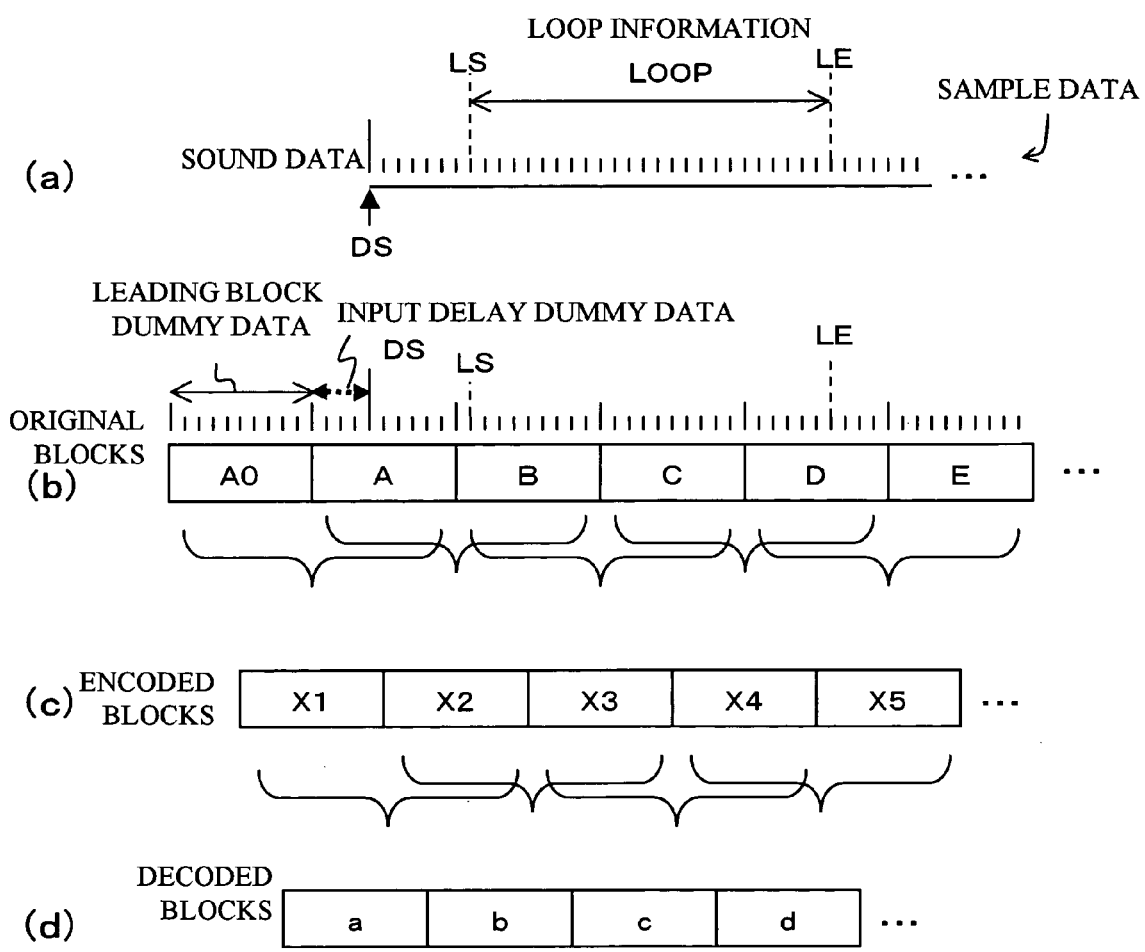
FIG. 9 is a diagram for explaining a method of dividing blocks of sound data 11 in a variational example.

Next, as shown in FIG. 9(*b*), dummy data whose number of samples is the obtained input delay dummy data sample number are added ahead of the sound data 11.

Here, will be considered the case where the number of samples of one block is L and the loop end position becomes the X-th sample ($1<=X<=L$) in the block including the loop end position when the original sound data is divided beginning at its top. Further, it is assumed that the loop end sample condition number is N. In the case where $X>=N$, it is not necessary to redivide the sound data into blocks. On the other hand, in the case where $X<N$, the input delay dummy data are added ahead. The number of samples of the input delay dummy data to be added is $N-X$.

However, when audio codec delay (encoding delay and decoding delay) occurs, the number of samples of the input delay dummy data to be added ahead of the sound data becomes $N-1-(X-1+ED+DD) \% L$ (% means residue arithmetic). When the expression gives 0 or less as the number of samples of the dummy data, then the sound data 11 are divided and encoded without adding the input delay dummy data.

Next, at ahead of the sound data 11, the encode processing unit 110 adds a block A0 to be paired with the block A at the time of encoding. The block A0 is a block of dummy data (hereinafter, referred to as leading block dummy data). The leading block dummy data are silence data, for example.

Thus-divided sound data are encoded as described above, to obtain encoded data.

Figure 10:
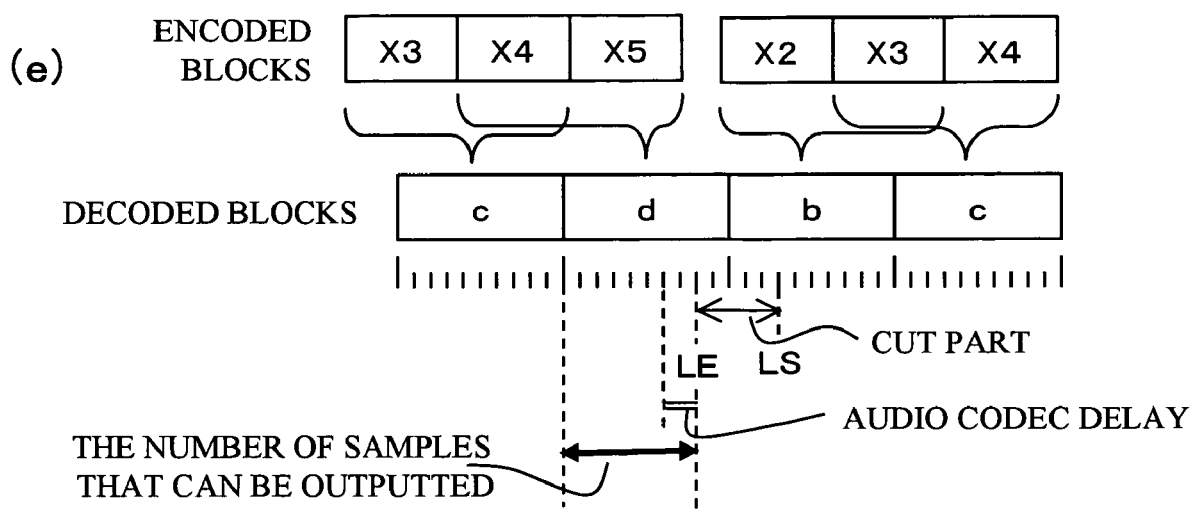
FIG. 10 is a diagram for explaining processing in blocks at the time of looping in a variational example.

FIG. 10 shows playing at the time of looping in thus-obtained encoded data. As shown in the figure, the loop end position LE is not located at the end of the decoded block d. However, the decoded block d includes a sufficient number of samples that can be outputted. As a result, the processing load at the time of looping is reduced.

In the above example, silence data are used as the leading block dummy data. However, the present embodiment is not limited to this. As the leading block dummy data, may be used data that has a correlation with a block to be paired with. Further, similarly to the ahead of the sound data, data having a correlation with a block to be paired with may be used as dummy data to be added to the end part (end block dummy data). In that case, it is possible to improve sound quality at the start and end positions of the sound data.

Further, in the case where the start position of the sound data coincides with the loop start position, then, as the leading block dummy data, may be used data that has some degree of continuity with the sound data at the loop start position.

In detail, sound data located just before the loop end position are used as the leading block dummy data. Usually, a piece of music is composed such that the loop end can be smoothly connected to the loop start. Thus, in many cases, sound data at the loop end position has some degree of continuity with sound data at the loop start position.

Figure 11:
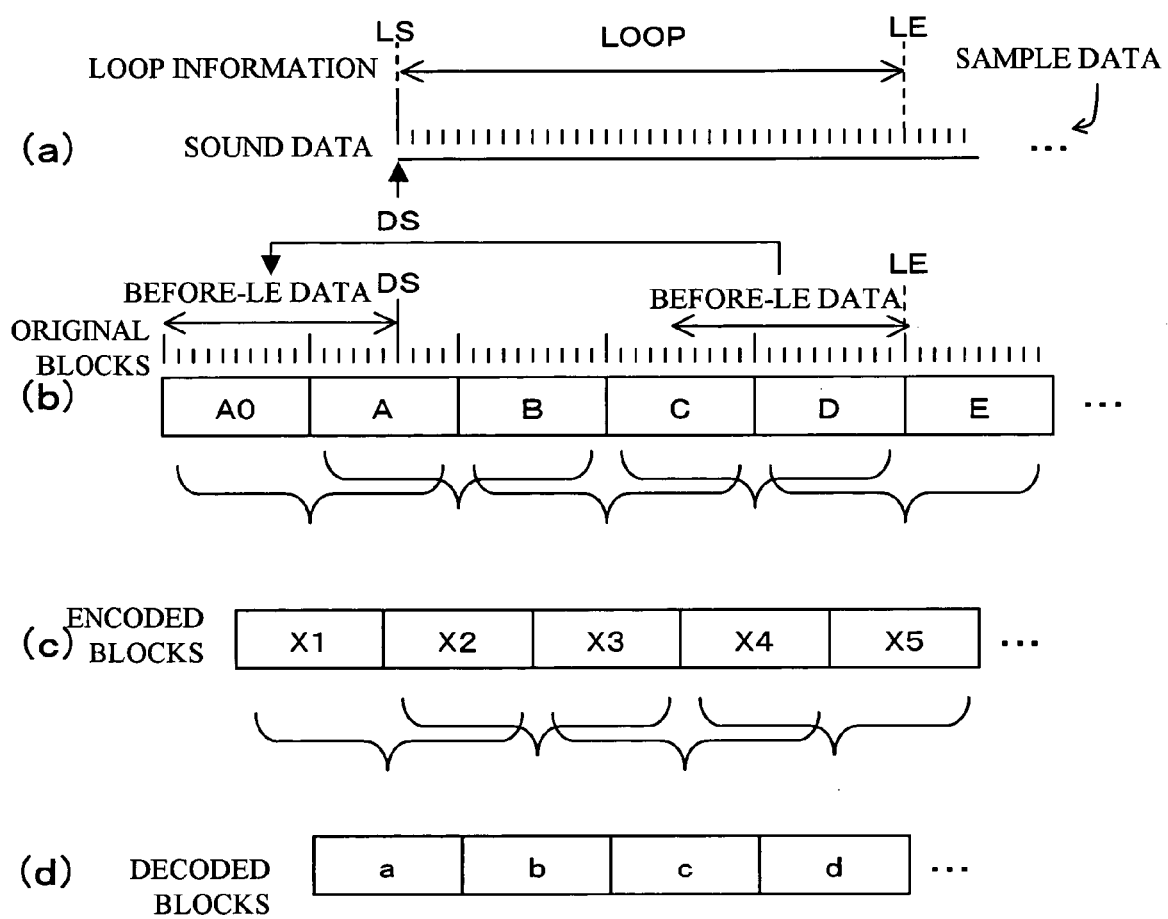
FIG. 11 is a diagram for explaining a method of dividing blocks of sound data 11 in a variational example.

Such a case will be described referring to FIG. 11. In the sound data shown in FIG. 11, the start position of the sound data coincides with the loop start position.

In this case, the encode processing unit 110 divides the sound data as follows, before encoding.

First, as described above, the number of samples of the required input delay dummy data is obtained. Next, the sum of the number of samples of the input delay dummy data and the number of samples of the leading block dummy data (the number of samples corresponding to one block) is obtained. Then, samples of the sound data as many as thus-obtained number are extracted before the loop end. The extracted data are added ahead of the sound data, and then, the sound data are divided into blocks, beginning at the top (See FIG. 11(*b*)).

Further, in the case where the end position of the sound data coincides with the loop end position, then data having some degree of continuity with the sound data at the loop end position may be used as the end block dummy data.

Figure 12:
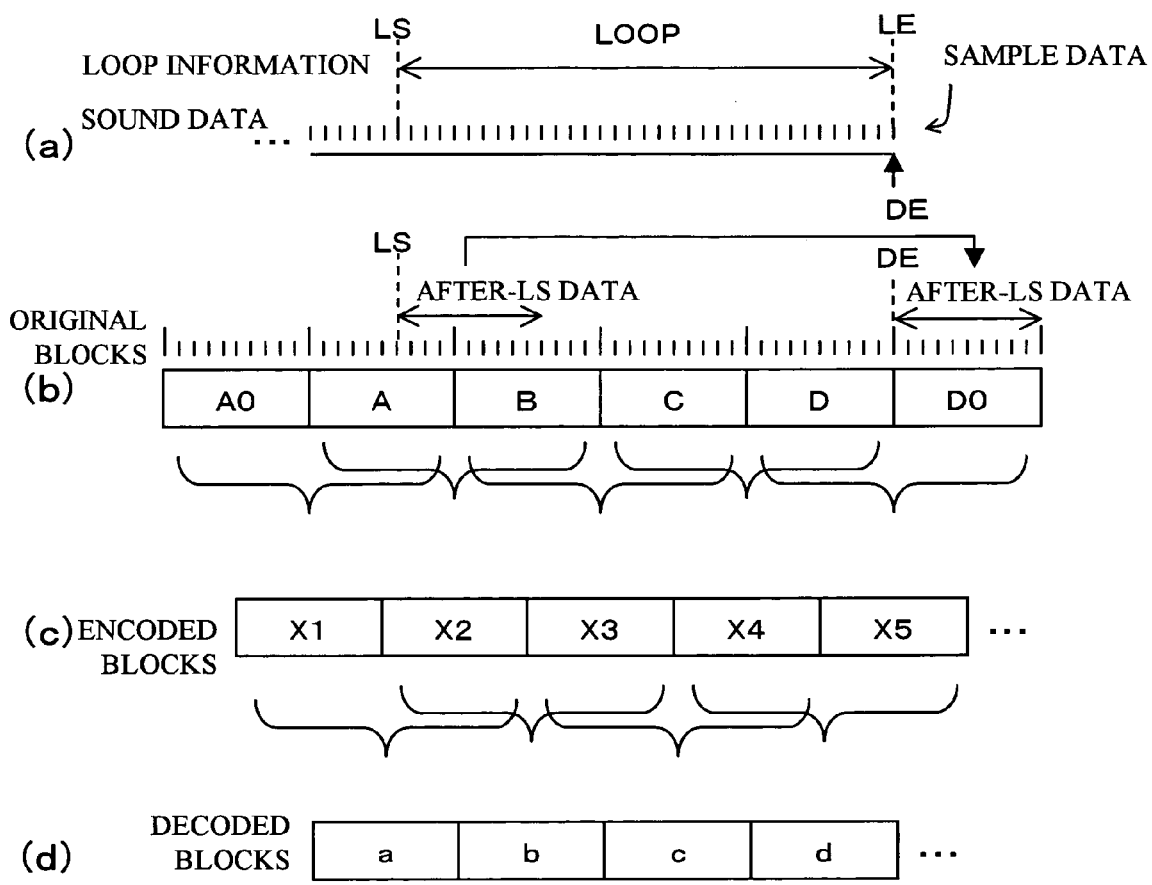
FIG. 12 is a diagram for explaining a method of dividing blocks of sound data 11 in a variational example.

In detail, sound data located just after the loop start position are used as the end block dummy data. Such a case will be described referring to FIG. 12. In the sound data shown in FIG. 12, the end position (DE) of the sound data coincides with the loop end position.

In this case, the encode processing unit 110 divides the sound data as follows, before encoding.

First, as described above, the number of samples of the required end block dummy data is obtained. In the case where the end position of the sound data (i.e., the loop end position) is located at the end of a block, the number of samples of the required dummy data is the number of samples corresponding to one block. Next, samples of the sound data as many as thus-obtained number are extracted after the loop start position. Then, the extracted data are added to the end of the sound data, and then, the sound data are divided into blocks, beginning at the top.

The above embodiment has been described mainly with respect to the case employing the encoding method in which two consecutive blocks are used to generate one block of encoded data. However, the present invention can be applied also to the case of employing an encoding method in which three or more consecutive original blocks are used to generate one block of encoded data.

Further, the present invention can be applied also to the case of employing a decoding method in which three or more consecutive encoded blocks are used to generate one block of decoded data.

The invention claimed is:

1. A sound data encoding apparatus for processing all inputted sound data as same frequency data and encoding sound data having a loop part whose loop start position and loop end position are designated, wherein:
   said sound data encoding apparatus comprises:
   a block dividing means that divides the sound data into blocks; and
   an encoding means that encodes said blocks in groups of a plurality of consecutive blocks; and
   said block dividing means divides said sound data to have the loop end position included in a block of a decoded block which is outputted when the sound data is divided into said blocks according to predetermined rules and thereafter encoded by the encoding means followed by decoding by a decoding apparatus, to be nearer to an end of the block than a predetermined position.

2. A sound data encoding apparatus for processing all inputted sound data as same frequency data and encoding sound data having a loop part whose loop start position and loop end position are designated, comprising:
   a block dividing means that divides the sound data into blocks; and
   an encoding means that encodes said blocks in groups of a plurality of consecutive blocks;
   wherein:
   said block dividing means divides said sound data to have the loop end position included in a block of a decoded block which is outputted when the sound data is divided into said blocks according to predetermined rules and thereafter encoded by the encoding means followed by decoding by a decoding apparatus, to be in last position of the block.

3. A sound data encoding apparatus for processing all inputted sound data as same frequency data and encoding sound data having a loop part whose loop start position and loop end position are designated, comprising:
   a storing means that stores a loop end sample condition number;
   a block dividing means that divides the sound data into blocks; and
   an encoding means that encodes said blocks in groups of a plurality of consecutive blocks;
   wherein:
   said block dividing means divides said sound data to have the sound data to be played at a time of the loop to include at least the loop end sample condition number, in a block of a decoded block which is outputted when the sound data is divided into said blocks according to predetermined rules and thereafter encoded by the encoding means followed by decoding by a decoding apparatus.

4. A sound data encoding apparatus for processing all inputted sound data as same frequency data and encoding sound data having a loop part whose loop start position and loop end position are designated, comprising:
   a block dividing means that divides the sound data into blocks; and
   an encoding means that encodes said blocks in groups of a plurality of consecutive blocks;
   wherein:
   said block dividing means divides said sound data to have the sound data added ahead thereof with dummy data whose number of samples is less than or equal to obtained number of samples ranging from the loop end position to an end of a block that includes said loop end position, in the block of a decoded block which is outputted when the sound data is divided into said blocks according to predetermined rules and thereafter encoded by the encoding means followed by decoding by a decoding apparatus.

5. A sound data encoding apparatus according to claim 4, wherein:
said sound data encoding apparatus stores a number of samples corresponding to an audio codec delay; and
said block dividing means uses said number of samples corresponding to the audio codec delay to obtain said number of samples ranging from the loop end position to the end of the block that includes said loop end position in said decoded blocks.

6. A sound data encoding apparatus according to claim 1, further comprising:
a loop information output means that outputs loop information used for specifying a sound data start position, a sound data end position, the loop start position and the loop end position in the decoded data outputted by decoding the encoded data encoded by said encoding means.

7. A sound data encoding apparatus according to claim 6, wherein:
said loop information includes information of a number of samples of dummy data added ahead of said sound data.

8. A sound data decoding apparatus that sequentially reads encoded data encoded by the sound data encoding apparatus according to claim 1, and decodes said encoded data in groups of a plurality of consecutive blocks.

9. A sound data decoding apparatus processing all inputted sound data as same frequency data and, wherein:
said sound data decoding apparatus comprises:
a decoding means that sequentially reads the encoded data encoded by the sound data encoding apparatus according to claim 6 and decodes said encoded data in groups of a plurality of consecutive blocks; and
a play means that uses said loop information to specify the sound data start position, the sound data end position, the loop start position and the loop end position in the decoded data; and
at a time of playing back a decoded block that includes the sound data start position, said play means jumps samples before the sound data start position and plays back samples on and after the sound data start position;
at a time of playing back a decoded block that includes the sound data end position, said play means plays back samples up to the sound data end position;
at a time of playing back a decoded block that includes the loop start position, said play means jumps samples before the loop start position and plays back samples on and after the loop start position; and
at a time of playing back a decoded block that includes the loop end position, said play means plays back samples up to the loop end position.

10. A program stored on a computer readable recording medium for making a computer function as a sound data encoding apparatus processing all inputted sound data as same frequency data and that encodes sound data having a loop part whose loop start position and loop end position are designated, wherein:
said program makes said computer function as a block dividing means that divides the sound data into blocks and as an encoding means that encodes said blocks in groups of a plurality of consecutive blocks; and
said block dividing means divides said sound data to have the loop end position included in a block of a decoded block which is outputted when the sound data is divided into said blocks according to predetermined rules and thereafter encoded by the encoding means followed by decoding by a decoding apparatus, to be nearer to an end of the block than a predetermined position.

11. A program stored on a computer readable recording medium for making a computer function as a sound data encoding apparatus processing all inputted sound data as same frequency data and that encodes sound data having a loop part whose loop start position and loop end position are designated, wherein:
said program makes said computer function as a block dividing means that divides the sound data into blocks and as an encoding means that encodes said blocks in groups of a plurality of consecutive blocks; and
said block dividing means divides said sound data to have the loop end position included in a block of a decoded block which is outputted when the sound data is divided into said blocks according to predetermined rules and thereafter encoded by the encoding means followed by decoding by a decoding apparatus, to be in last position of the block.

12. A program stored on a computer readable recording medium for making a computer function as a sound data encoding apparatus processing all inputted sound data as same frequency data and that encodes sound data having a loop part whose loop start position and loop end position are designated, wherein:
said program makes said computer function as a storing means that stores a loop end sample condition number, as a block dividing means that divides the sound data into blocks, and as an encoding means that encodes said blocks in groups of a plurality of consecutive blocks; and
said block dividing means divides said sound data to have the sound data to be played at a time of the loop to include at least the loop end sample condition number, in a block of a decoded block which is outputted when the sound data is divided into said blocks according to predetermined rules and thereafter encoded by the encoding means followed by decoding by a decoding apparatus.

13. A program stored on a computer readable recording medium for making a computer function as a sound data encoding apparatus processing all inputted sound data as same frequency data and that encodes sound data having a loop part whose loop start position and loop end position are designated, wherein:
said program makes said computer function as a block dividing means that divides the sound data into blocks and as an encoding means that encodes said blocks in groups of a plurality of consecutive blocks; and
said block dividing means divides said sound data to have the sound data added ahead thereof with dummy data whose number of samples is less than or equal to obtained number of samples ranging from the loop end position to an end of a block that includes said loop end position, in the block of a decoded block which is outputted when the sound data is divided into said blocks according to predetermined rules and thereafter encoded by the encoding means followed by decoding by a decoding apparatus.

14. A program stored on a computer readable recording medium according to claim 13, wherein:
said sound data encoding apparatus stores a number of samples corresponding to an audio codec delay; and said block dividing means uses said number of samples corresponding to the audio codec delay to obtain said number of samples ranging from the loop end position to the end of the block that includes said loop end position in said decoded blocks.

15. A program stored on a computer readable recording medium according to claim 10, wherein:
said program makes said computer function as a loop information output means that outputs loop information used for specifying a sound data start position, a sound data end position, the loop start position and the loop end position in the decoded data outputted by decoding the encoded data encoded by said encoding means.

16. A program stored on a computer readable recording medium according to claim 15, wherein:
said loop information includes information of a number of samples of dummy data added ahead of said sound data.

17. A program stored on a computer readable recording medium for processing all inputted sound data as same frequency data and making a computer function as a sound data decoding apparatus that sequentially reads encoded data encoded by the sound data encoding apparatus according to claim 1 and decodes said encoded data in groups of a plurality of consecutive blocks.

18. program stored on a computer readable recording medium for processing all inputted sound data as same frequency data and making a computer function as a sound data decoding apparatus, wherein:
said sound data decoding apparatus comprises:
a decoding means that sequentially reads the encoded data encoded by the sound data encoding apparatus according to claim 6 and decodes said encoded data in groups of a plurality of consecutive blocks; and
a play means that uses said loop information to specify the sound data start position, the sound data end position, the loop start position and the loop end position in the decoded data; and
at a time of playing back a decoded block that includes the sound data start position, said play means jumps samples before the sound data start position and plays back samples on and after the sound data start position;
at a time of playing back a decoded block that includes the sound data end position, said play means back samples up to the sound data end position;
at a time of playing back a decoded block that includes the loop start position, said play means jumps samples before the loop start position and plays back samples on and after the loop start position; and
at a time of playing back a decoded block that includes the loop end position, said play means plays back samples up to the loop end position.

19. A computer-readable record medium that records a program according to claim 10.

20. A sound data encoding method for a sound data encoding apparatus processing all inputted sound data as same frequency data and that encodes sound data having a loop part whose loop start position and loop end position are designated, wherein:
said sound data encoding method comprises:
a block dividing step, in which the sound data are divided into blocks; and
an encoding step, in which said blocks are encoded in groups of a plurality of consecutive blocks; and
in said block dividing step, said block dividing means divides said sound data to have the loop end position included in a block of a decoded block which is outputted when the sound data is divided into said blocks according to predetermined rules and thereafter encoded by the encoding means followed by decoding by a decoding apparatus, to be nearer to an end of the block than a predetermined position.

21. A sound data encoding method for a sound data encoding apparatus processing all inputted sound data as same frequency data and that encodes sound data having a loop part whose loop start position and loop end position are designated, wherein:
said sound data encoding method comprises:
a block dividing step, in which the sound data are divided into blocks; and
an encoding step, in which said blocks are encoded in groups of a plurality of consecutive blocks; and
in said block dividing step, said block dividing means divides said sound data to have the loop end position included in a block of a decoded block which is outputted when the sound data is divided into said blocks according to predetermined rules and thereafter encoded by the encoding means followed by decoding by a decoding apparatus, to be in last position of the block.

22. A sound data encoding method for a sound data encoding apparatus processing all inputted sound data as same frequency data and that encodes sound data having a loop part whose loop start position and loop end position are designated, wherein:
said sound data encoding method comprises a storing means that stores a loop end sample condition number;
said sound data encoding method comprises:
a block dividing step, in which the sound data are divided into blocks; and
an encoding step, in which said blocks are encoded in groups of a plurality of consecutive blocks; and
in said block dividing step, said block dividing means divides said sound data to have the sound data to be played at a time of the loop to include at least the loop end sample condition number, in a block of a decoded block which is outputted when the sound data is divided into said blocks according to predetermined rules and thereafter encoded by the encoding means followed by decoding by a decoding apparatus.

23. A sound data encoding method for a sound data encoding apparatus processing all inputted sound data as same frequency data and that encodes sound data having a loop part whose loop start position and loop end position are designated, wherein:
said sound data encoding method comprises:
a block dividing step, in which the sound data are divided into blocks; and
an encoding step, in which said blocks are encoded in groups of a plurality of consecutive blocks; and
in said block dividing step, said block dividing means divides said sound data to have the sound data added ahead thereof with dummy data whose number of samples is less than or equal to obtained number of samples ranging from the loop end position to an end of a block that includes said loop end position, in the block of a decoded block which is outputted when the sound data is divided into said blocks according to predetermined rules and thereafter encoded by the encoding means followed by decoding by a decoding apparatus.

24. A sound data encoding method according to claim 23, wherein:
said sound data encoding apparatus stores a number of samples corresponding to an audio codec delay; and
in said block dividing step, said number of samples corresponding to the audio codec delay is used to obtain said number of samples ranging from the loop end position to the end of the block that includes said loop end position in said decoded blocks.

25. A sound data encoding method according to claim 20, further comprising:
   a loop information output step, which outputs loop information used for specifying a sound data start position, a sound data end position, the loop start position and the loop end position in the decoded data outputted by decoding the encoded data encoded in said encoding step.

26. A sound data encoding method according to claim 25, wherein:
   said loop information includes information of a number of samples of dummy data added to ahead of said sound data.

27. A sound data decoding method, wherein:
   encoded data encoded by the sound data encoding method according to claim 20 are sequentially read, and said encoded data are decoded in groups of a plurality of consecutive blocks.

28. A sound data decoding method for processing all inputted sound data as same frequency data, wherein:
   said sound data decoding method comprises:
   a decoding step, in which the encoded data encoded by the sound data encoding apparatus according to claim 6 are sequentially read, and said encoded data are decoded in groups of a plurality of consecutive blocks; and
   a playing step, in which said loop information is used to specify the sound data start position, the sound data end position, the loop start position and the loop end position in the decoded data; and
   in said playing step,
   at a time of playing back a decoded block that includes the sound data start position, samples before the sound data start position are jumped, and samples on and after the sound data start position are played back;
   at a time of playing back a decoded block that includes the sound data end position, samples up to the sound data end position are played back;
   at a time of playing back a decoded block that includes the loop start position, samples before the loop start position are jumped, and samples on and after the loop start position are played back; and
   at a time of playing back a decoded block that includes the loop end position, samples up to the loop end position are played back.

29. The sound data encoding apparatus of claim 1, wherein a size of said blocks is unrelated to a size of the loop part.

* * * * *